May 4, 1948.  J. C. SHAW  2,440,919
BEARING FOR RECIPROCATING SLIDES
Filed Feb. 1, 1946
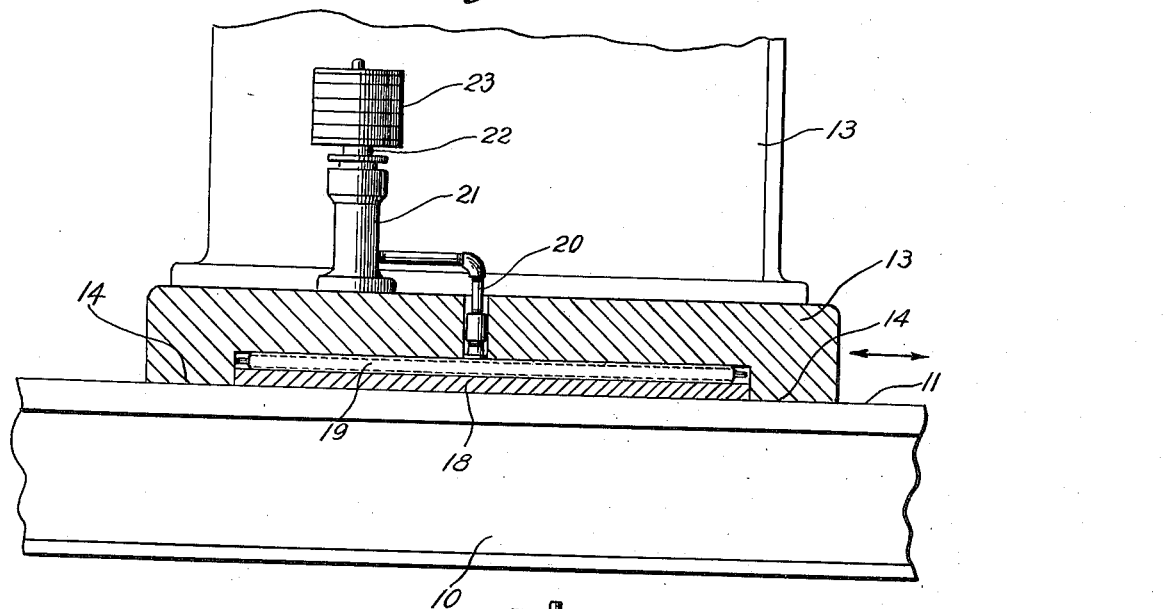
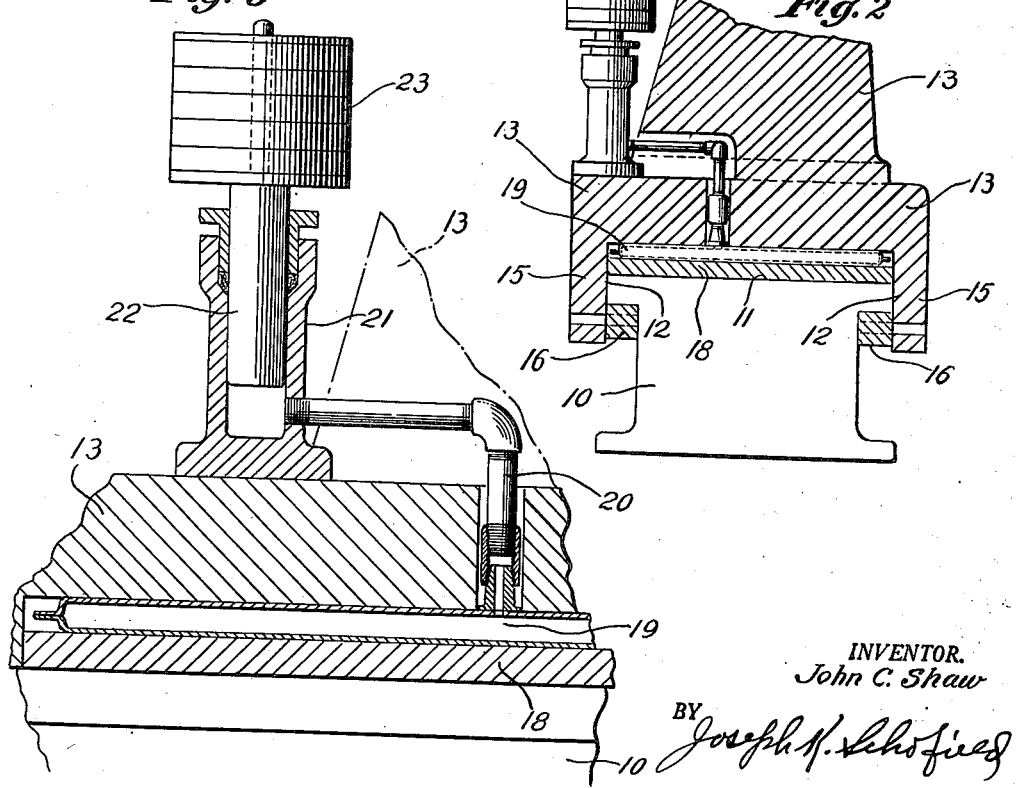
INVENTOR.
John C. Shaw
BY Joseph H. Schofield
ATTORNEY Patented May 4, 1948

2,440,919

UNITED STATES PATENT OFFICE 2,440,919

BEARING FOR RECIPROCATING SLIDES

John C. Shaw, Bloomfield, Conn., assignor to Niles-Bement-Pond Company, West Hartford, Conn., a corporation of New Jersey Application February 1, 1946, Serial No. 644,722

3 Claims. (Cl. 308—3)

This invention relates to a slidable support and bearing for a member of a machine tool having reciprocatory movement horizontally in a plane.

An object of the invention is to provide a bearing for a horizontally reciprocatory member such as a column or table of a machine tool that will maintain contact of the entire bearing surface between the movable member and the base, the bearing pressure being uniform throughout the area of the member in contact with the base.

A feature that enables the above object to be accomplished is that a flexible member housed within the lower portion of the slidable member engages the surface of the base and is maintained in contact therewith by pressure acting substantially uniformly over its entire upper surface.

Another feature that is important is that pressure within a hollow member disposed between the flexible bearing member and the column may be regulated so that the unit pressure upon the flexible bearing member may take any portion of or the total load of the slidable member or column on the base.

With the above and other objects in view, the invention includes the features of construction and operation set forth in the following specification and illustrated in the accompanying drawing.

In the accompanying drawing annexed hereto and forming a part of this specification, I have shown the invention embodied in a base and column construction for a machine tool in which the column is slidably movable over the upper plane surface of the horizontally extending base, but it will be understood that the invention can be otherwise embodied and that the drawing is not to be construed as defining or limiting the scope of the invention, the claims appended to this specification being relied upon for that purpose.

In the drawing:

Figure 1 is a front elevation of a slidably movable column on a machine tool base, the column being shown partly in section.

Fig. 2 is an end elevation of the parts shown in Fig. 1, and

Fig. 3 is a detail sectional view in elevation of the means for supplying fluid under a predetermined pressure to the flexible hollow member.

In the above-mentioned drawing there has been shown but one embodiment of the invention which is now deemed preferable, but it is to be understood that changes and modifications may be made within the scope of the appended claims without departing from the spirit of the invention.

Briefly, and in its broadest aspect, the invention may include the following principal parts: First, a base having a horizontal carefully finished plane surface; second a column movable over the horizontal surface of the base and having guiding means to maintain the movable member in proper lateral and vertical position relative to the base; third, a flexible member housed within the lower portion of the column and engaging the horizontal bearing surface of the base; fourth, a bellows or hollow member disposed within the column and bearing against the lower portion of the column and the upper surface of the flexible bearing member; fifth, fluid supplying means to the interior of said bellows or hollow member; and sixth, a weighted plunger within a vertical cylinder connected to the interior of this bellows to apply any predetermined unit pressure to the fluid within the bellows.

Referring more in detail to the figures of the drawing, there is shown a base 10 having a carefully finished plane upper surface 11 that may be disposed horizontally. The lateral vertical surfaces 12 of the base adjacent this horizontal bearing surface 11 are also finished and in parallel relation one with the other. Adapted to bear upon this horizontal surface 11 is a slidably movable column 13, the opposite end surfaces 14 of its lower portions engaging spaced apart areas of the horizontal bearing surface 11 for short distances. This column 13 has lateral flanges 15 engaging the parallel vertical walls on opposite sides of the base 10. Gibs 16 mounted at the lower ends of these flanges contact horizontal surfaces 17 on the underside of the bearing surface of the base 10 to maintain the column 13 against vertical movement.

Housed within the lower central portion of the column or slidable member 13 is a relatively thin member 18 preferably of metal, plastic or other suitable bearing material maintained in position by the end portions of the column and by the side flanges 15. This member 18 is substantially flexible enough to conform itself to any slight irregularities in the horizontal bearing surface 11 of the base 10.

Above this flexible member 18 and extending substantially over its entire upper surface is a hollow bellows member 19 hermetically sealed about its periphery. Its lower surface bears against the upper surface of the flexible bearing member 18 and its upper surface lies against the surface of the recess provided within the slidable member or column 13 to house the flexible bearing strip and bellows.

Connected into the interior of this bellows 19 so that it is in fluid connection therewith is a small vertically disposed tube extending through a recess provided therefor in the column 13 and by means of which fluid may be admitted to the space within the bellows. To this vertical tube 20 by a suitable tubular member is connected a cylinder 21 having a plunger 22 in fluid tight but slidable contact therewith. At the upper end of the plunger 22 are disposed removable members 23 of any predetermined total weight.

As shown in Fig. 3 of the drawing, the cylinder 21 may be mounted at any convenient position on the column 13 and have its tubes 20 connecting its lower portion with the interior of the bellows 19. With the plunger 22 removed from its cylinder 21 the space within the bellows 19 may be filled with a liquid. With the plunger 22 positioned as shown in the drawings, and with suitable weights 23 applied thereto, uniform fluid pressure will exist throughout the area of the bellows 19 contacting the flexible bearing member 18.

By means of the above described construction it will be seen that with the bellows 19 when completely filled with fluid such as an oil, water or air, and with weights 23 on the plunger 22 extending into the cylinder 21, the pressure exerted upon the flexible bearing member 18 will be uniform and of any predetermined amount determined by the weight of the members 23 attached to the plunger 22.

By varying the amount of weight upon the plunger 22 the total pressure exerted upon the flexible bearing strip 18 in contact with the bearing surface 11 of the base 10 by the bellows 19 may be widely varied and may be substantially equal to the total weight of the slidably movable member 13 and parts carried thereby. Also the entire area of the flexible bearing member 18 at all times will be in uniform contact with the contacting surface of the base.

What I claim is:

1. A supporting and bearing means for a reciprocating member comprising, a base having a plane horizontal bearing surface thereon, a member movable over said bearing surface and having surfaces contacting said bearing surface, a flexible member housed by said first mentioned member and in contact with said bearing surface, and fluid pressure means forcing said flexible member toward said bearing surface.

2. A supporting and bearing means for a reciprocating member comprising, a base having a plane horizontal bearing surface thereon, a member movable over said bearing surface and having surfaces contacting said bearing surface, a flexible member housed by said first mentioned member and in contact with said bearing surface, and a fluid filled hollow bellows member disposed between said slidable member and flexible member and forcing said flexible member toward said bearing surface.

3. A supporting and bearing means for a reciprocating member comprising, a base having a plane horizontal bearing surface thereon, a member movable over said bearing surface and having surfaces contacting said bearing surface, a flexible member housed by said first mentioned member and in contact with said bearing surface, a hollow bellows member disposed between said slidable member and flexible member, and means to apply fluid under predetermined pressure to said bellows member.

JOHN C. SHAW.